US012780028B2

(12) United States Patent
Chen et al.

(10) Patent No.: US 12,780,028 B2
(45) Date of Patent: Nov. 3, 2026

(54) WIRELESS CHARGING METHOD FOR CHARGING UNDERWATER MOVING DEVICE

(71) Applicant: Pioneer Material Precision Tech Co., Ltd., New Taipei City (TW)

(72) Inventors: Tai-Yu Chen, New Taipei City (TW); Li-Yuan Yeh, New Taipei City (TW); Jian-Jhih Huang, New Taipei City (TW); Chih-Wei Shen, New Taipei City (TW); Chang-Qi Zhang, New Taipei City (TW)

(73) Assignee: Pioneer Material Precision Tech Co., Ltd., New Taipei City (TW)

( * ) Notice: Subject to any disclaimer, the term of this patent is extended or adjusted under 35 U.S.C. 154(b) by 524 days.

(21) Appl. No.: 18/411,780

(22) Filed: Jan. 12, 2024

(65) Prior Publication Data

US 2025/0065743 A1 Feb. 27, 2025

(30) Foreign Application Priority Data

Aug. 24, 2023 (TW) ................................ 112131953

(51) Int. Cl.
*B60L 53/38* (2019.01)
*B60L 53/12* (2019.01)
(Continued)

(52) U.S. Cl.
CPC ............... *B60L 53/38* (2019.02); *B60L 53/12* (2019.02); *B60L 53/36* (2019.02); *B60L 53/66* (2019.02);
(Continued)

(58) Field of Classification Search
CPC .......... B60L 53/38; B60L 53/12; B60L 53/66; B60L 53/36; H02J 50/90; H02J 7/82; B63G 8/001; H04B 13/02
(Continued)

(56) References Cited

U.S. PATENT DOCUMENTS 9,051,036 B2 * 6/2015 Kim ......................... B63G 8/16
9,985,482 B2 * 5/2018 Yoshida ................. B64U 50/35
(Continued)

FOREIGN PATENT DOCUMENTS

CN 102723791 10/2012
CN 110391690 10/2019
CN 114243938 3/2022

OTHER PUBLICATIONS

Search Report in Taiwan Appln. No. 112131953, mailed on Jan. 25, 2024, 2 pages (with English translation).

*Primary Examiner* — Thomas K Pham
*Assistant Examiner* — David Tardif
(74) *Attorney, Agent, or Firm* — Fish & Richardson P.C.

(57) ABSTRACT

A wireless charging method for charging an underwater moving device is implemented by a charging device. The charging device receives electricity from a cable, and includes a first underwater wireless communication unit, a position holding unit, a first control unit, and a wireless charging transmitter. The underwater moving device includes a second underwater wireless communication unit, a wireless charging receiver, and a rechargeable battery. The first underwater wireless communication unit obtains moving device information by communicating with the second underwater wireless communication unit. The position holding unit holds the underwater moving device at a charging location, and generates a positioning success signal after the underwater moving device is held at the charging location. Upon receiving the positioning success signal, the first
(Continued)

control unit controls the wireless charging transmitter to charge the rechargeable battery based on the moving device information.

9 Claims, 4 Drawing Sheets

(51) Int. Cl.

| | |
|---|---|
| ***B60L 53/36*** | (2019.01) |
| ***B60L 53/66*** | (2019.01) |
| ***B63G 8/00*** | (2006.01) |
| ***H02J 7/82*** | (2026.01) |
| ***H02J 50/90*** | (2016.01) |
| ***H04B 13/02*** | (2006.01) |

(52) U.S. Cl.
CPC ................ *B63G 8/001* (2013.01); *H02J 7/82* (2026.01); *H02J 50/90* (2016.02); *H04B 13/02* (2013.01); *B60L 2200/32* (2013.01); *B63G 2008/004* (2013.01); *B63G 2008/005* (2013.01)

(58) Field of Classification Search
USPC .......................................................... 320/108
See application file for complete search history.

(56) References Cited

U.S. PATENT DOCUMENTS

| | | | | |
|---|---|---|---|---|
| 10,367,378 | B2 * | 7/2019 | Niizuma | H02J 50/60 |
| 10,549,652 | B2 * | 2/2020 | Deguchi | B60L 53/12 |
| 12,128,781 | B2 * | 10/2024 | Tsai | B60L 53/36 |
| 2015/0002092 | A1 * | 1/2015 | Niizuma | B60L 5/005 320/108 |
| 2018/0297677 | A1 * | 10/2018 | Sakaue | H02J 50/005 |
| 2023/0141507 | A1 * | 5/2023 | Lee | H02J 50/90 320/109 |

* cited by examiner

WIRELESS CHARGING METHOD FOR CHARGING UNDERWATER MOVING DEVICE

CROSS-REFERENCE TO RELATED APPLICATION

This application claims priority to Taiwanese Invention Patent Application No. 112131953, filed on Aug. 24, 2023, the entire disclosure of which is incorporated by reference herein.

FIELD

The disclosure relates to a wireless charging method for charging an underwater moving device, and more particularly to a wireless charging method for charging an underwater moving device with a charging device that is floating on a water surface.

BACKGROUND

A wireless autonomous underwater vehicle (AUV) is capable of performing various underwater activities (e.g., underwater exploration or surveying) within a wide range of underwater areas. However, since the wireless AUV does not include a cable, the wireless AUV is unable to operate in a traditional way where the electric power is provided by a mothership through a cable. Similarly, an ornamental bionic fish (also known as bionic robot fish) does not include a cable, either. The wireless AUV or the bionic robot fish must move to a designated location and rise to the water surface before the power runs out so that they can be electrically connected to an electric cable for charging through the electric cable.

SUMMARY

Therefore, an object of the disclosure is to provide a wireless charging method for charging an underwater moving device that can alleviate at least one of the drawbacks of the prior art.

According to the disclosure, a wireless charging method for charging an underwater moving device is provided to be implemented by a charging device. The charging device receives electricity from a cable, and includes a first underwater wireless communication unit, a position holding unit, a first control unit, and a wireless charging transmitter. The underwater moving device includes a second underwater wireless communication unit, a wireless charging receiver, and a rechargeable battery. The method includes steps of: the first underwater wireless communication unit obtaining moving device information by communicating with the second underwater wireless communication unit, where the first underwater wireless communication unit and the second underwater wireless communication unit support underwater wireless communication technology; the position holding unit holding the underwater moving device at a charging location, and generating a positioning success signal after the underwater moving device is held at the charging location; and upon receiving the positioning success signal, the first control unit controlling the wireless charging transmitter, based on the moving device information, to charge the rechargeable battery by transmitting power to the wireless charging receiver using the electricity received from the cable, where the wireless charging transmitter and the wireless charging receiver support wireless charging technology.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
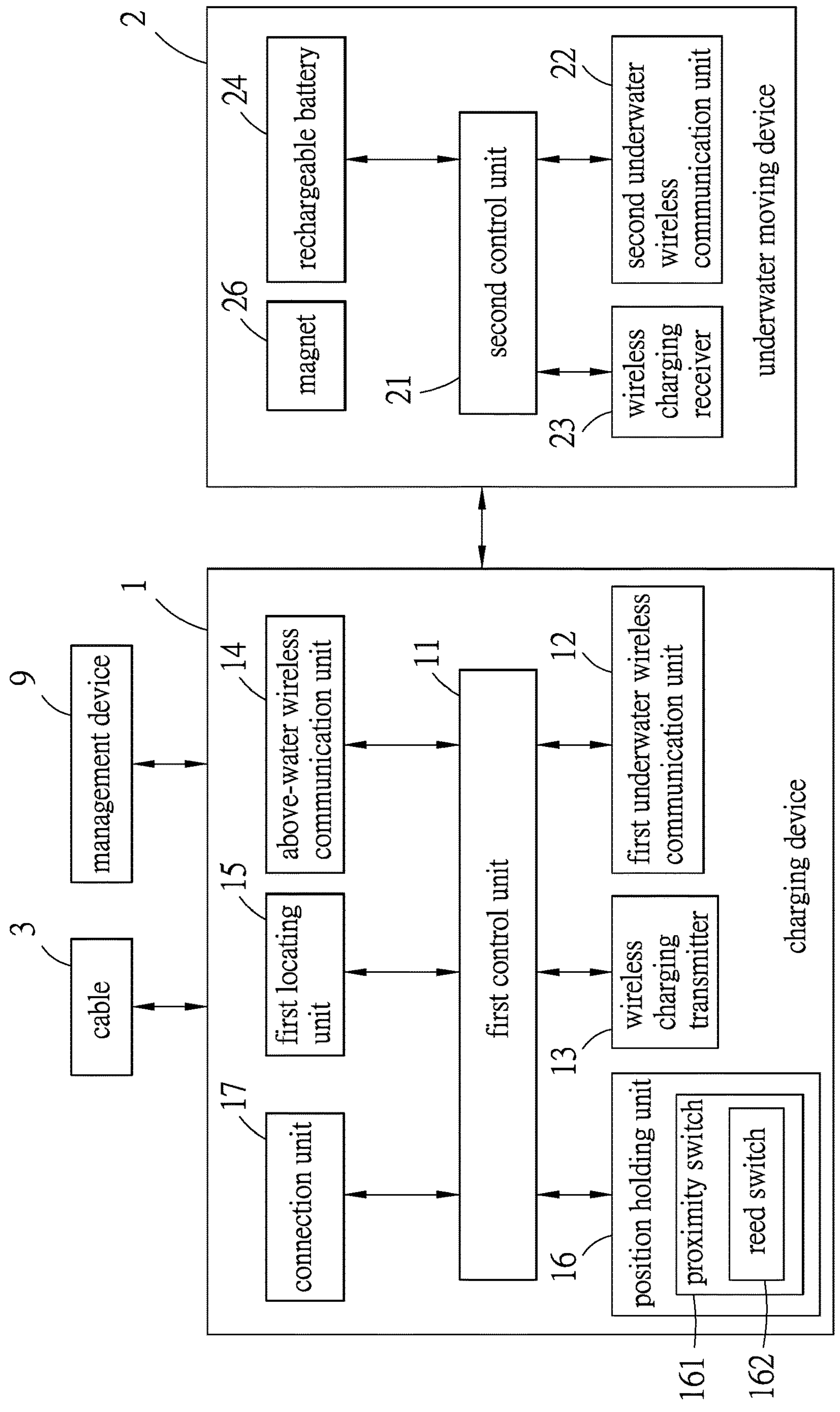
FIG. 1 is a block diagram illustrating a charging device and an underwater moving device according to a first embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
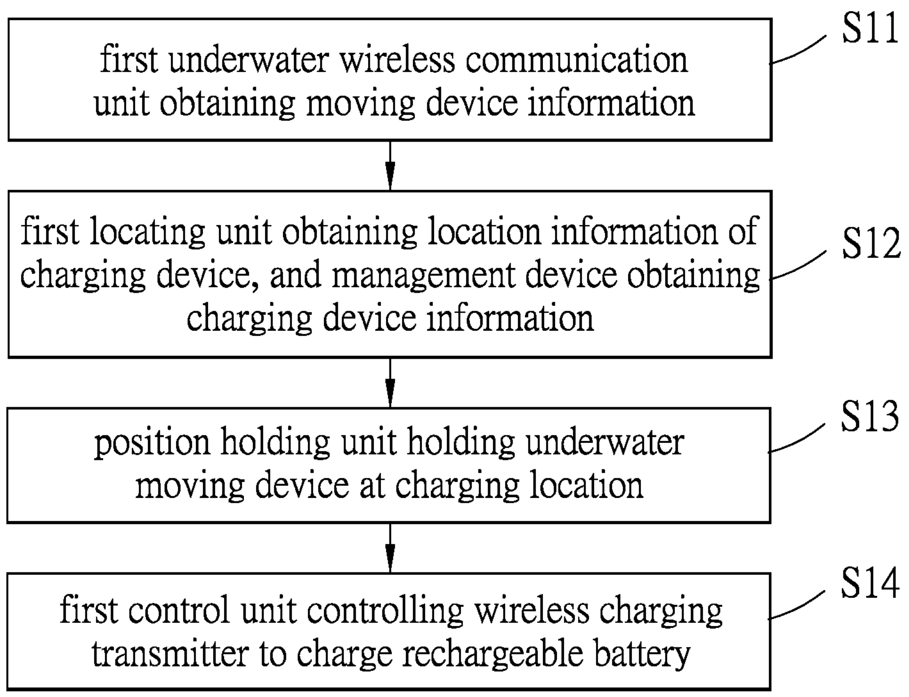
FIG. 2 is a flow chart illustrating a wireless charging method for charging an underwater moving device according to the first embodiment of the disclosure.

Referring to FIGS. 1 and 2, a first embodiment of a wireless charging method for charging an underwater moving device is implemented by a charging device 1, an underwater moving device 2, and a management device 9. The wireless charging method in the first embodiment includes steps S11 to S14. The charging device 1 includes a first control unit 11, and further includes a first underwater wireless communication unit 12, a wireless charging transmitter 13, an above-water wireless communication unit 14, a first locating unit 15, a position holding unit 16, and a connection unit 17 that are electrically connected to the first control unit 11. The charging device 1 receives electricity from an external power source (not shown) through a cable 3 so as to provide the electricity to components of the charging device 1. The underwater moving device 2 includes a second control unit 21, and further includes a second underwater wireless communication unit 22, a wireless charging receiver 23, and a rechargeable battery 24 that are electrically connected to the second control unit 21. Each of the first control unit 11 and the second control unit 21 may be a microcontroller unit (MCU), or any circuit capable of implementing functionalities of this disclosure. The management device 9 may be a computer that includes network connection capability.

In this embodiment, the charging device 1 floats on a water surface, and a portion of the charging device 1 that is above the water surface has an appearance of a lotus. The underwater moving device 2 is a robot fish, and the second control unit 21 is configured to control a driving module (not shown) of the robot fish to operate based on a predetermined program command, so as to move the robot fish in an underwater environment. The predetermined program command may be pre-stored in the second control unit 21 and may be related to controlling movement of the robot fish (e.g., rising, sinking, moving forward, or turning left or right). The driving module may include various joints, mechanisms for rising and sinking, a fin or a fish tail for moving and turning in the underwater environment, a motor, a gear set, link rods, etc.

In step S11, the first underwater wireless communication unit 12 of the charging device 1 obtains moving device information of the underwater moving device 2 by communicating with the second underwater wireless communication unit 22 of the underwater moving device 2. The moving device information may include a movement trajectory, a movement time, a motor rotation count, a battery power, a battery voltage value, a battery output current value, an operation error record, etc.

The first underwater wireless communication unit 12 and the second underwater wireless communication unit 22 support underwater wireless communication technology. In this embodiment, the underwater wireless communication technology uses either an ultrasonic wave or a radio wave that is a Long Range (LoRa) technique as a transmission medium. For example, the first underwater wireless communication unit 12 may include an ultrasonic transducer configured to convert original signals that are in a form of electrical signals modulated using amplitude-shift keying (ASK) into ultrasonic signals for transmission in the underwater environment. The second underwater wireless communication unit 22 includes another ultrasonic transducer that is configured to convert incoming ultrasonic signals into electrical signals so that the second control unit 21 may obtain the original signals from the electrical signals thus converted.

In step S12, the first locating unit 15 of the charging device 1 obtains location information of the charging device 1, and the management device 9 obtains charging device information of the charging device 1 by communicating with the above-water wireless communication unit 14 of the charging device 1. The charging device information includes the location information of the charging device 1 and a charging status that indicates whether the charging device 1 is charging the underwater moving device 2.

The location information of the charging device 1 may be obtained by the first locating unit 15 using Global Positioning System (GPS) technology, Ultra-wideband (UWB) technology, Bluetooth®, or other micro-location technologies. The above-water wireless communication unit 14 and the management device 9 support land-based wireless communication technology, which uses, for example, Wi-Fi, fourth-generation wireless (4G), or fifth-generation wireless (5G).

In step S13, the position holding unit 16 of the charging device 1 holds the underwater moving device 2 at a charging location, and generates a positioning success signal after the underwater moving device 2 is held at the charging location. In this embodiment, the underwater moving device 2 includes a magnet 26, and the position holding unit 16 includes a proximity switch 161 that includes a reed switch 162. The magnet 26 is mounted on the underwater moving device 2 in a manner that when the underwater moving device 2 is held at the charging location, a position of the magnet 26 corresponds to a position of the proximity switch 161. In some embodiments, when the magnet 26 is close to the position holding unit 16 so that the magnet 26 drives the reed switch 162 from a non-conducting position to a conducting position, a logical value of the proximity switch 161 is changed, thus causing the position holding unit 16 to generate the positioning success signal (e.g., changing the positioning success signal to a specific logic value that represents a success of positioning). At this time, the underwater moving device 2 is at the charging location (i.e., a location where the wireless charging transmitter 13 is able to charge the underwater moving device 2 through the wireless charging receiver 23). Furthermore, the underwater moving device 2 and the charging device 1 may be designed in a manner where the magnet 26 or another magnet of the underwater moving device 2 is magnetically attracted to and held by a metal plate of the charging device 1 so as to stabilize the underwater moving device 2 at the charging location.

In step S14, upon receiving the positioning success signal, the first control unit 11 of the charging device 1 controls the wireless charging transmitter 13, based on the moving device information (e.g., when the battery voltage value is lower than a battery voltage threshold, or when the battery power is lower than a battery power threshold), to charge the rechargeable battery 24 of the underwater moving device 2 by transmitting power to the wireless charging receiver 23 using the electricity received from the cable 3. The charging device 1 further updates the charging status to the management device 9 through the above-water wireless communication unit 14 to indicate that the charging device 1 is charging the underwater moving device 2. The wireless charging transmitter 13 and the wireless charging receiver 23 support wireless charging technology, which may follow, for example, a Qi standard, an Alliance for Wireless Power (A4WP) standard, or a Power Matters Alliance (PMA) standard.

The connection unit 17 of the charging device 1 may be a serial interface that includes a power transmission contact and a communication signal contact. In some embodiments, before the charging device 1 performs step S11, the connection unit 17 of the charging device 1 may be electrically connected to a connection unit of another charging device through another cable. The connection unit 17 of the charging device 1 may then send the electricity received from the cable 3 to the another charging device through the power transmission contact for use by the another charging device, and send information (e.g., the moving device information, and/or status of the charging device 1, such as charging voltage/current/power of the charging device 1, or a signal indicating that the underwater moving device 2 is held at the charging location) to the another charging device through the communication signal contact for use by the another charging device.

Figure 3:
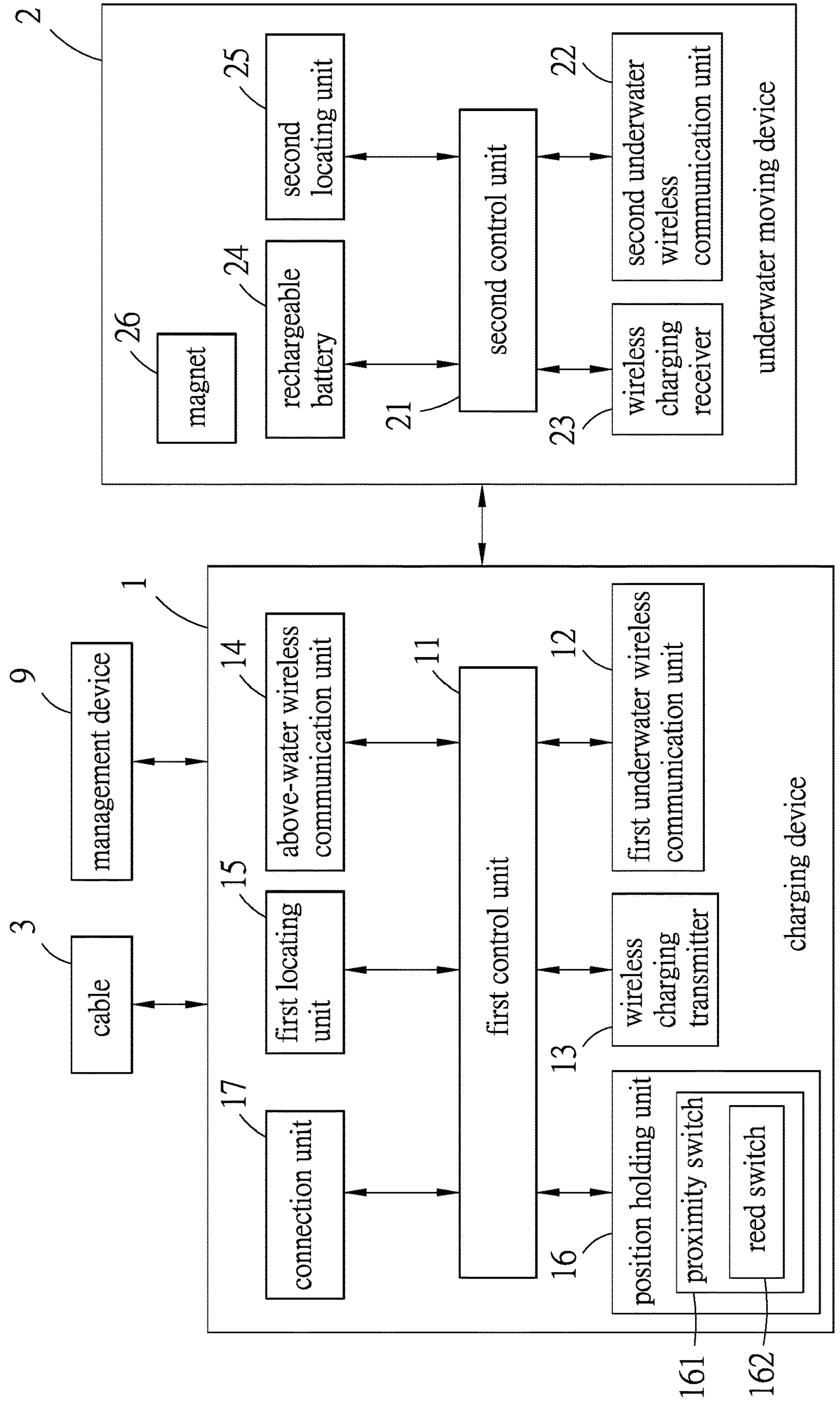
FIG. 3 is a block diagram illustrating a charging device and an underwater moving device according to a second embodiment of the disclosure.
Figure 4:
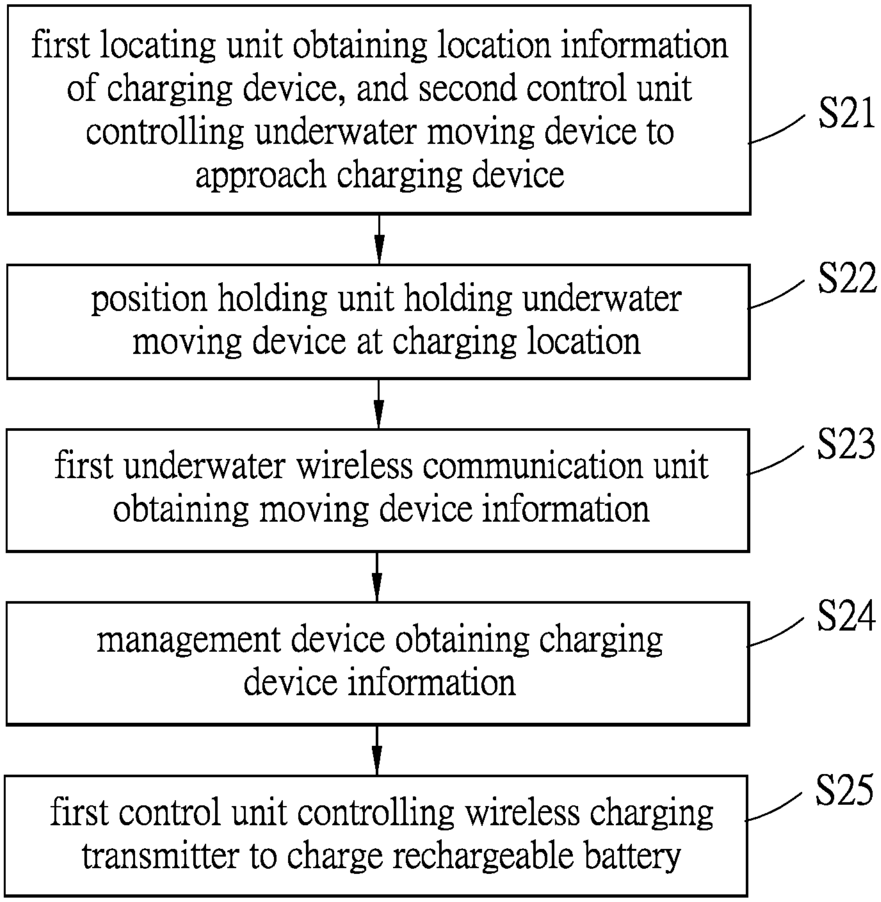
FIG. 4 is a flow chart illustrating a wireless charging method for charging an underwater moving device according to the second embodiment of the disclosure.

Referring to FIGS. 3 and 4, a second embodiment of the wireless charging method for charging an underwater moving device is implemented by the charging device 1, the underwater moving device 2, and the management device 9 that are similar to those of the first embodiment. Different from the first embodiment, in the second embodiment, the underwater moving device 2 further includes a second locating unit 25 that is electrically connected to the second control unit 21. The wireless charging method in the second embodiment includes steps S21 to S25.

In this embodiment, the first locating unit 15 and the second locating unit 25 respectively obtain the location information of the charging device 1 and location information of the underwater moving device 2 using the UWB technology. For example, the charging device 1 and the underwater moving device 2 are disposed in a pool that includes a plurality of positioning stations mounted at fixed locations around the pool and supporting the UWB technology, and the first locating unit 15 and the second locating unit 25 may respectively obtain coordinates of the charging device 1 (i.e., the location information of the charging device 1) and coordinates of the underwater moving device 2 (i.e., the location information of the underwater moving device 2) through communicating with the positioning stations. A quantity of positioning stations may be three, but the disclosure is not limited as such.

In step S21, the first locating unit 15 of the charging device 1 obtains the location information of the charging device 1. When the second control unit 21 determines that a charging condition is met, the second control unit 21 controls the underwater moving device 2 to rise to obtain the location information of the underwater moving device 2 through the second locating unit 25. In this embodiment, the charging condition is met when the battery power is lower than a predetermined battery power threshold, such as 20% of a fully charged power, but the disclosure is not limited as such. The second control unit 21 then obtains the location information of the charging device 1 by communicating with the first underwater wireless communication unit 12 through the second underwater wireless communication unit 22, and controls the underwater moving device 2 to sink and to move and approach the charging device 1 based on the location information of the underwater moving device 2 and the location information of the charging device 1

Step S22 is identical to step S13. Step S23 is similar to step S11, and the difference is that the moving device information is obtained by the first underwater wireless communication unit 12 after the first control unit 11 determines that the positioning success signal has been generated by the position holding unit 16 in step S22, but the order of the method is not limited to such. In step S24, the management device 9 obtains the charging device information of the charging device 1 by communicating with the above-water wireless communication unit 14 of the charging device 1. Step S25 is identical to step S14.

Similarly, in some embodiments, before the charging device 1 performs step S21, the connection unit 17 of the charging device 1 may be electrically connected to a connection unit of another charging device through another cable so as to send the electricity or information to the another charging device.

It should be noted that in steps S14 and S25, when the charging device 1 has completed charging of the rechargeable battery 24 (e.g., when the second control unit 21 determines that the battery power of the rechargeable battery 24 is higher than 90% of the fully charged power), or when the underwater moving device 2 is determined not to require charging based on the moving device information (e.g., when the battery voltage value is not lower than the battery voltage threshold, or when the battery power is not lower than the battery power threshold), the second control unit 21 controls the driving module of the underwater moving device 2 to operate, thus driving the underwater moving device 2 to move rapidly so as to detach the magnet 26 from the metal plate of the charging device 1, and to cause the underwater moving device 2 to leave the charging location. After the magnet 26 is detached from the charging device 1, the reed switch 162 of the proximity switch 161 is driven from the conducting position to the non-conducting position, thus changing the logical value of the proximity switch 161, and a logical value of the positioning success signal is changed. The charging device 1 may then stop charging the underwater moving device 2 based on the logical value thus changed.

In some embodiments, the orders of steps S11 to S14 and steps S21 to S25 may be changed as long as necessary information is obtained before performing each of the steps.

In summary, the wireless charging method of the disclosure allows the charging device 1 that is floating on the water surface to charge the underwater moving device 2 wirelessly. The charging device 1 may further receive commands (e.g., for powering on or powering off of the charging device 1, for setting charging power of the charging device 1, for notifying the underwater moving device 2 to leave the charging device 1 when the charging device 1 is to be turned off, and/or for notifying the underwater moving device 2 with low battery power to approach the charging device 1 for charging) from the management device 9 through the above-water wireless communication unit 14, and send out the commands received from the management device 9 to the underwater moving device 2 that is close to the charging device 1 through the first underwater wireless communication unit 12 and the second underwater wireless communication unit 22. The disclosure is not only highly integrated, but can solve the problem of being unable to see the charging device 1 in the underwater environment. Furthermore, since the method is simple to be applied, has high versatility and flexibility, and may be used for landscaping, the cost of the method is controllable and has high application value.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A wireless charging method for charging an underwater moving device, said wireless charging method being implemented by a charging device, and comprising steps of:

a first underwater wireless communication unit obtaining moving device information by communicating with a second underwater wireless communication unit, where the charging device receives electricity from a cable, and includes the first underwater wireless communication unit, a position holding unit, a first control unit, and a wireless charging transmitter; the underwater moving device includes the second underwater wireless communication unit, a wireless charging receiver, and a rechargeable battery; and the first underwater wireless communication unit and the second underwater wireless communication unit support underwater wireless communication technology;

the position holding unit holding the underwater moving device at a charging location, and generating a positioning success signal after the underwater moving device is held at the charging location; and upon receiving the positioning success signal, the first control unit controlling the wireless charging transmitter, based on the moving device information, to charge the rechargeable battery by transmitting power to the wireless charging receiver using the electricity received from the cable, where the wireless charging transmitter and the wireless charging receiver support wireless charging technology.

2. The method as claimed in claim 1, the charging device further including an above-water wireless communication unit, said method being implemented by the charging device and a management device, and further comprising a step of the management device obtaining charging device information of the charging device by communicating with the above-water wireless communication unit, wherein the above-water wireless communication unit supports land-based wireless communication technology.

3. The method as claimed in claim 2, the charging device further including a first locating unit, said method further comprising a step of the first locating unit obtaining location information of the charging device, wherein the charging device information includes the location information of the charging device and a charging status that indicates whether the charging device is charging the underwater moving device.

4. The method as claimed in claim 3, the underwater moving device further including a second control unit and a second locating unit, said method being implemented by the underwater moving device, and further comprising steps of:

when determining that a charging condition is met, the second control unit controlling the underwater moving device to rise to obtain location information of the underwater moving device through the second locating unit;

the second controlling unit obtaining the location information of the charging device by communicating with the first underwater wireless communication unit through the second underwater wireless communication unit; and the second controlling unit controlling the underwater moving device to move and approach the charging device based on the location information of the underwater moving device and the location information of the charging device.

5. The method as claimed in claim 3, wherein the location information of the charging device is obtained by the first locating unit using one of Global Positioning System (GPS) technology and Ultra-wideband (UWB) technology, and the land-based wireless communication technology uses one of Wi-Fi, fourth-generation wireless (4G), and fifth-generation wireless (5G).

6. The method as claimed in claim 1, wherein the underwater wireless communication technology uses one of an ultrasonic wave and a radio wave that is a Long Range (LoRa) technique as a transmission medium.

7. The method as claimed in claim 1, the underwater moving device further including a magnet, the position holding unit including a proximity switch that includes a reed switch, wherein when the underwater moving device is held at the charging location, the magnet drives the reed switch from a non-conducting position to a conducting position, thereby causing the position holding unit to generate the positioning success signal.

8. The method as claimed in claim 1, wherein the wireless charging technology follows one of a Qi standard, an Alliance for Wireless Power (A4WP) standard, and a Power Matters Alliance (PMA) standard.

9. The method as claimed in claim 1, the charging device further including a connection unit electrically connected to another connection unit of another charging device through another cable, said method further comprising a step of the connection unit sending the electricity from the cable to said another connection unit through said another cable.

* * * * *